United States Patent [19]

Nightingale

[11] 4,285,498
[45] Aug. 25, 1981

[54] CONTROL VALVES

[75] Inventor: Douglas D. J. Nightingale, St. Albans, England

[73] Assignee: Imperial Chemical Industries Limited, London, England

[21] Appl. No.: 795,306

[22] Filed: May 9, 1977

[30] Foreign Application Priority Data

May 17, 1976 [GB] United Kingdom ............... 20196/76
Jul. 29, 1976 [GB] United Kingdom ............... 31652/76

[51] Int. Cl.³ ...................... F16K 41/00; F16V 31/50
[52] U.S. Cl. ..................................... 251/214; 277/152; 277/165; 277/207 R; 251/215; 251/335 R; 251/368
[58] Field of Search ............... 251/214, 215, 368, 318, 251/324, 335 R; 277/152, 165, 178, 207 R

[56] References Cited

U.S. PATENT DOCUMENTS

| 922,294 | 5/1909 | Kobus .................................. 251/214 |
| 1,106,933 | 8/1914 | Farley .................................. 251/214 |
| 3,305,211 | 2/1967 | Phillips ................................ 251/368 |
| 3,325,143 | 6/1967 | Phillips ................................ 251/368 |
| 3,327,992 | 6/1967 | Billeter et al. ....................... 251/215 |
| 3,490,736 | 1/1970 | Snyder ................................. 251/215 |
| 3,589,677 | 6/1971 | Segers .................................. 251/215 |
| 3,658,290 | 4/1972 | Peters et al. ......................... 251/215 |
| 3,747,479 | 7/1973 | Nightingale et al. ................ 251/214 |

FOREIGN PATENT DOCUMENTS

| 1450523 | 9/1971 | Fed. Rep. of Germany .......... 251/214 |
| 2010050 | 9/1971 | Fed. Rep. of Germany .......... 251/214 |
| 2432028 | 1/1975 | Fed. Rep. of Germany .......... 251/214 |
| 924710 | 5/1963 | United Kingdom .................... 251/215 |

Primary Examiner—Martin P. Schwadron
Assistant Examiner—G. L. Walton
Attorney, Agent, or Firm—Cushman, Darby & Cushman

[57] ABSTRACT

A control valve has a gland seal comprising a sealing member formed of a flexible polymeric material, preferably PTFE. The sealing member comprises a tubular portion located around the valve spindle and a radially extending flange encircling the tubular portion, the sealing member being supported within the hollow body by its radially extending flange. The spindle and surrounding tubular portion have adjacent surfaces, at least one of which has an annular ridge biased into sealing contact with the other surface.

6 Claims, 11 Drawing Figures

CONTROL VALVES

The invention relates to valves for controlling fluid flow, e.g. in burettes, other laboratory glassware, and drain lines.

The invention provides a control valve comprising a hollow body having a flow passage for the fluid; a sealing member formed of a flexible polymeric material and comprising a tubular portion encircled by a radially extending flange, the sealing member being supported within the hollow body by its radially extending flange; and     a moveable spindle comprising means for occluding the flow passage during operation of the valve, and a stem connected to or integral with the occluding means, the spindle passing through the tubular portion of the sealing member with the exterior surface of the spindle adjacent to the interior surface of the tubular portion; at least one of the two adjacent surfaces having an annular ridge biased into sealing contact with the other surface to provide a gland seal against loss of the fluid from the valve body.

The sealing member may be secured within the body by having its flange clamped between two relatively moveable portions. For many applications where the tubular portion is not unduly long, a single flange clamped in this manner can provide sufficient support for the sealing member. However, where a long tubular portion is to be used, or where it is inconvenient to provide relatively moveable parts for clamping the flange, a plurality of flanges may be spaced along the tubular portion, and the sealing member simply slid into a tubular bore which is undersized with respect to the flanges so as to hold the sealing member firmly in position. Stops may be formed in the body to limit sliding movement of the sealing member, e.g. where vacuum is to be applied to that side of the member.

The flexibility of the sealing member can enable a good seal to be maintained, even when the stem is slightly oval in section, or not perfectly straight. To fully utilise the flexibility, annular ridges on the sealing member should be in planes different from and preferably remote from the plane of the flange. Similarly, where the annular ridges are on the spindle stem, they should be positioned such that during normal operation, the planes of the ridges remain different from and preferably remote from the plane of the flange. Furthermore for the same reasons, although the adjacent surfaces in the region of the intervening annular ridges will be held apart by the ridges, it is also preferable for those adjacent surfaces to be spaced apart over their whole areas.

By making the ridge stand proud of the surface from which it rises by an amount greater than the distance separating the two surfaces, the tubular portion around the ridge becomes distended outwards. In a preferred valve, all the sealing bias is derived from the stresses induced by this distension. This method of applying the bias has been found to be capable of effecting good seals over a range of spindle diameters, and over a wide range of pressure differentials. Additional means for increasing the bias can be added if desired, but these are not necessary for many applications, and may introduce a source of contamination when controlling corrosive fluids.

The preferred material for construction of the sealing member is polytetrafluoroethylene (PTFE). Even though it is well known that this material tends to creep under stress rather than provide a resilient flexibility, it was found to give good seals even when deriving all the sealing bias from its own resilience, and moreover there appeared to be no noticeable deterioration of the seal with time. Having discovered that PTFE was surprisingly effective in that respect, it was found also to bring the advantages of general inertness and low friction for which it is renowned. The PTFE may be a tetrafluoroethylene homopolymer or a copolymer containing a minor amount (e.g. up to 10% by weight of the polymer) of one or more comonomers such as ethylene or hexafluoropropene. The composition may also incorporate one or more fillers where appropriate.

The invention is illustrated by several specific embodiments described hereinafter by way of example, with reference to the drawings in which.

Figure 1:
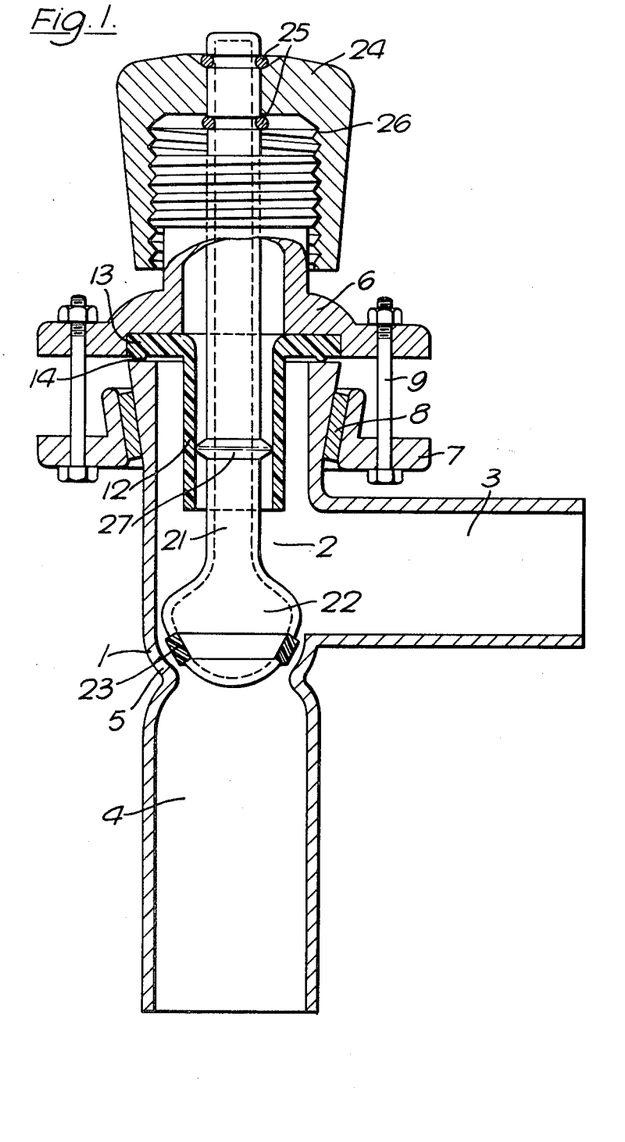
FIGS. 1–3 are sections through three valves suitable for plant and/or drain lines.

The valve illustrated in FIG. 1 is a glass valve suitable for plant and drain lines. The valve comprises a body member 1 forming the lower portion of a hollow body 2 into which open two tubes, 3, 4, thus providing a flow passage for fluid from one tube, through the space within the body, and out through the other tube. The end of one of the tubes is constricted where it enters the body, providing a valve seat 5. The other end of the body is formed by a closure member 6 secured in place by a clamping ring 7 (generally referred to as a "backing flange"), rubber insert 8 and bolts 9 in known manner.

Within the hollow body is a PTFE sealing member, comprising a tubular portion 12 encircled by a flange 13 extending radially outwards from one end of the tubular portion. The flange is clamped firmly between the body member 1 and the closure member 6, providing an effective gasket to seal against loss of fluid at the joint between the two members, assisted by a circular ridge 14. Also one end of the tubular portion is thus firmly positioned with respect to the surrounding body member, but the end remote from the flange, being of smaller diameter than the surrounding body, is free to move around by flexing of the sealing member. The internal surface of the tubular portion is smooth and cylindrical.

The valve spindle comprises a glass tube 21 forming the stem, with an enlarged portion 22 closing one end, and carrying a PTFE O-ring 23 located in a groove around the enlaged portion. The size of the O-ring is such that when pressed down onto the seat 5, the flow passage through the valve is occluded, and the rectangular cross-section illustrated is particularly suitable although O-rings of other cross-sections may be used. At the other end of the stem is a cap 24, held in place by O-rings 25 located in grooves around the glass stem 21.

On the inside of the cap are moulded threads 26 which engage corresponding threads on the closure member. Part way along the stem is an annular ridge 27 whose outside diameter is larger than the internal diameter of the sealing member so that an annular portion of the sealing member is distended radially outwards, and the stresses thus caused within the distended material maintain the sealing member biased into sealing contact with the ridge on the stem.

In use, rotation of the cap provides axial movement of the stem (possibly with some rotational movement also) because of the engaging screw threads, and the PTFE O-ring 23 is moved into or out of engagement with the valve seat accordingly. Loss of fluid from the valve body along the stem, is sealed against by the pressing of the sealing member against the annular ridge 27. As the spindle moves axially, so the ridge moves with respect to the sealing member, and different annular portions of the sealing member become distended outwards in their turn, to maintain the gland seal during operation of the valve.

Figure 2:
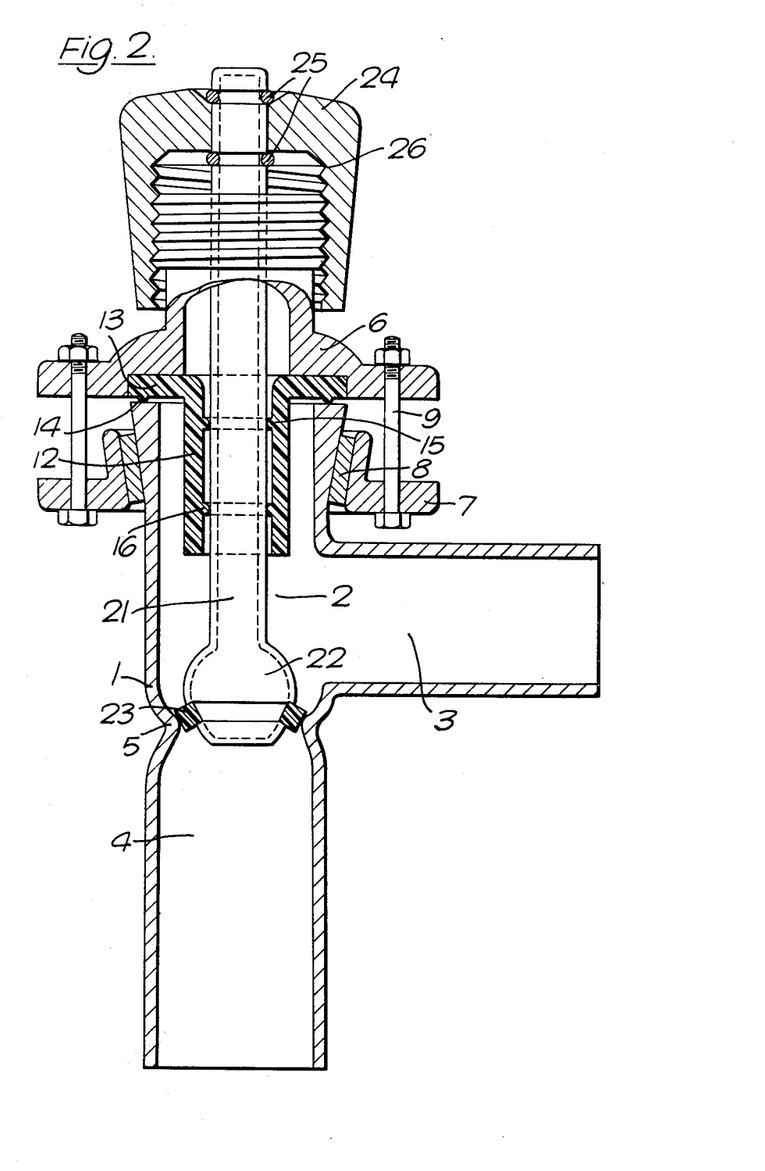

The valve shown in FIG. 2 is the same as that shown in FIG. 1 in many respects, and like reference numbers have been used for like parts. It does, however, differ in having a smooth tube for the stem, and two annular ridges 15, 16 machined on the internal surface of the sealing member. As in the previous illustration, the ridges are biased against the opposing surface by distension in the sealing member, but unlike the previous illustration, the same annular portion of sealing member is distended for all positions of the spindle. This action may be used to advantage where space is at a premium, in that by using only a single ridge on the sealing member, a shorter sealing member may be used than would be required were the ridge on the stem.

To test the applicability of these sealing members to large scale valves, a sealing member suitable for use with glass plant line of 10 cm internal diameter, was made and tested. The shape of the sealing member was substantially as shown in FIG. 2. The internal diameter was 40 mm and the length 10 cm. The ridges were 50 mm apart, and were used with a smooth shaft which was 0.38 mm oversize with respect to the ridges encircling it. This seal had a very low leak rate when tested under vacuum.

A further variation of the valve shown in FIG. 2, is a valve having just one ridge 15 on the sealing member and one ridge on the stem, the latter being like that 27 of FIG. 1.

The valve shown in FIG. 3 is again very similar to that shown in FIG. 1, except that the glass spindle has been sheathed in PTFE 17 round the enlarged portion, and extending up the stem to beyond the gland seal. Beneath the sheath is a rubber O-ring 18 located in a groove, the diameter of the O-ring being sufficient to distend radially outwards an annular portion of the sheath into sealing contact with the surrounding sealing member 11. In this example additional sealing bias may come from the resilience of the O-ring rather than just from the distension of the sealing member.

Figure 3:
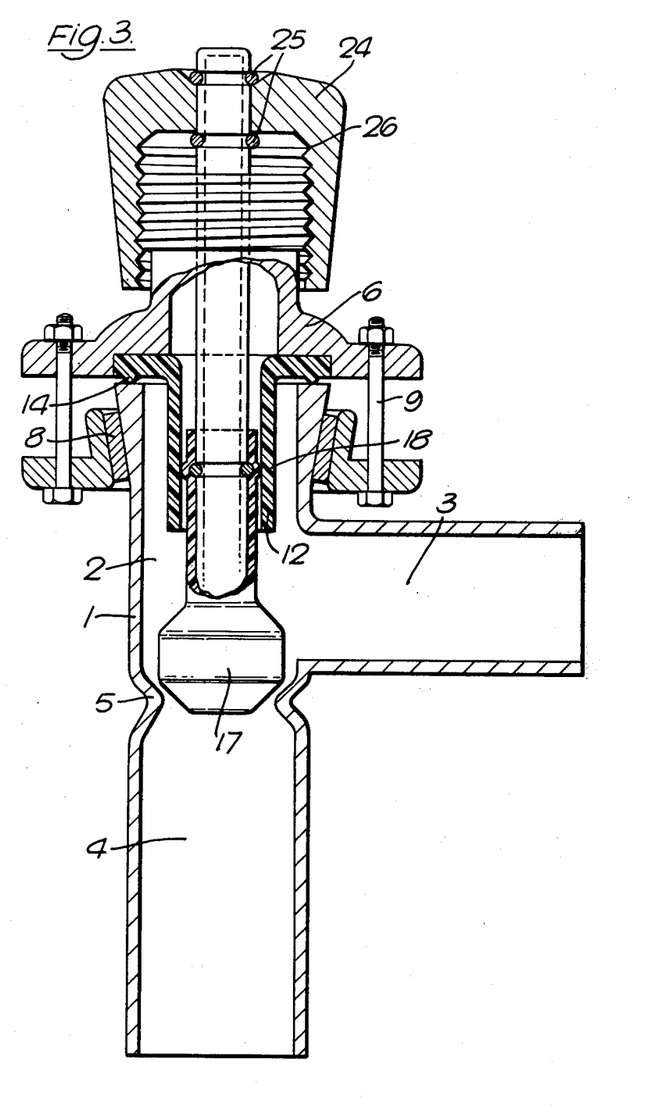

The three valves shown in FIGS. 1-3 have two body members clamped together using one known system, but other means may also be equally appropriate with modifications being made to the shapes of the components as required. For example, a beaded system may be used wherein a bead is formed around the mouths of the two parts to be joined, these then being surrounded by a rubber gasket and enclosed within a steel shell which is tightened until it holds the parts securely together. These generally have a PTFE liner between the glass and the rubber. The sealing member may require suitable shaping around the periphery of the flange to enable it to be gripped securely, and indeed it may be formed integrally with the PTFE liner.

The valves shown in FIGS. 1-3 may also be varied by using a domed closure member 6, inverting the sealing member 11 so that it extends into the upper part of the hollow body provided by the dome. However, this generally makes for a more bulky valve, but a compromise may be reached by using a sealing member like that shown in isolation in FIG. 4. This comprises a tubular portion 41 and a flange 42 which encircles the tubular portion about midway along its length instead of at one end. There are two annular ridges 43 on the internal surface of the tubular portion, one on each side of the flange, and by being at the two ends of the tubular portion, are again remote from the flange to enable the member to flex whenever the stem is displaced, and hence reduce possible breakages of the glass stems.

Figures 4, 5, 6, 7:
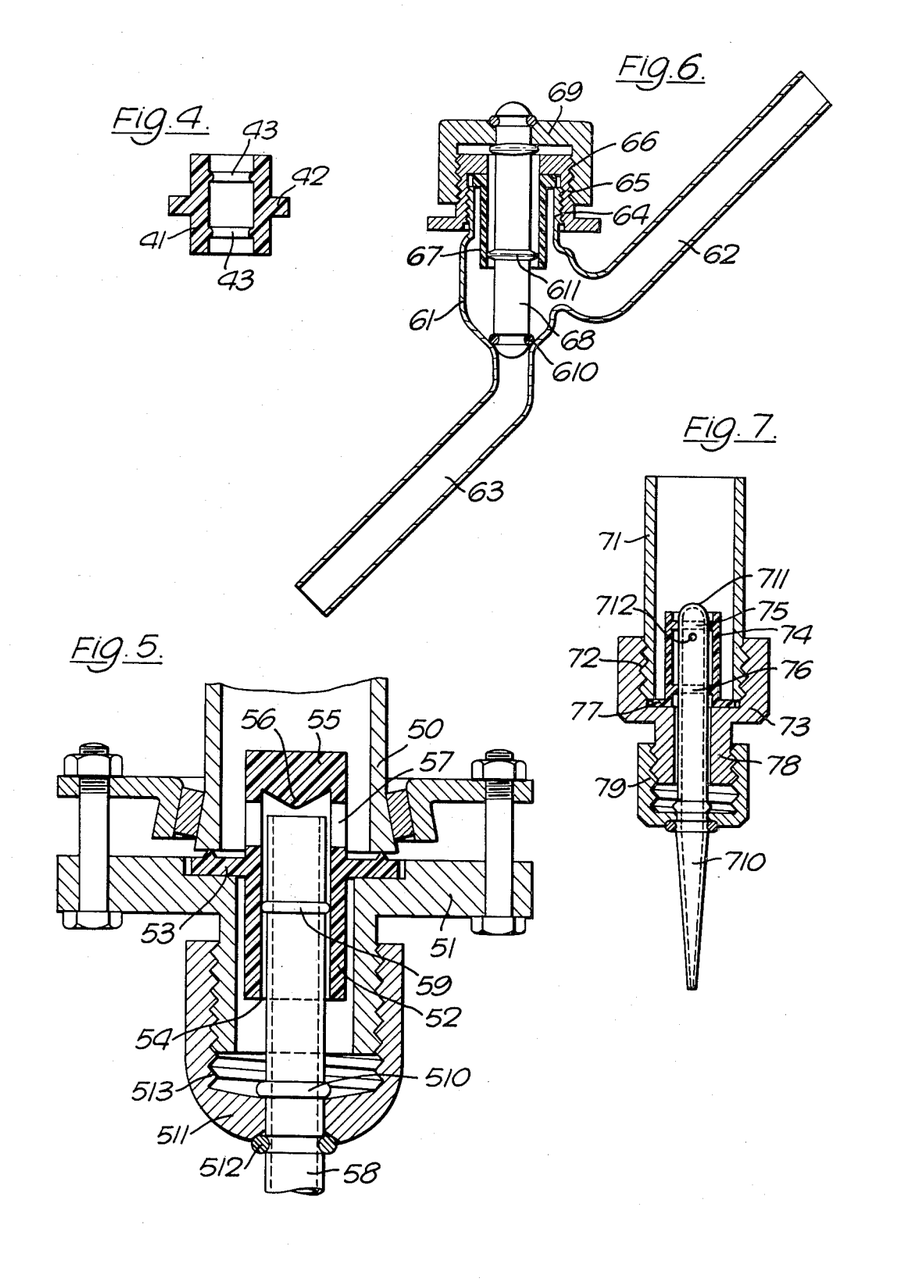
FIG. 4 is a section through a sealing member.
FIG. 5 is a section through a further drain line valve.
FIG. 6 is a section through a stop cock for laboratory glassware.
FIG. 7 is a section through a burette tap.

The valve shown in FIG. 5 is also suitable for use as a drain cock, and comprises a first body member 50 (which may be simply a buttressed end of a glass drain) and a closure member 51 clamped to the end of the first body member. Within the hollow body formed by those two members 50, 51, is a PTFE sealing member comprising a tubular portion 52 having an encircling flange 53 extending radially outwards about half way along its length. The flange is clamped between the body member and the closure member. The tubular portion has an open lower end 54 and a closed upper end 55 with a domed inner surface 56. Near the domed end are two large holes 57 through the tubular portion. Within the tubular portion, and extending out from its lower end 54 is a tubular glass spindle 58 having an encircling ridge 59 of diameter greater than the free diameter of the sealing member to distend the latter outwards and ensure sealing contact between them providing a gland seal similar to that shown in FIG. 1. The spindle also has a collar 510 against which a moulded cap 511 is held by an O-ring 512. The cap has internal screw threads 513 which engage corresponding threads on the closure member.

To close the valve, the cap 511 is screwed upwards until the end of the glass tube is tight against the domed end of the PTFE sealing member, thereby preventing fluid entering the upper end of the tubular spindle. Fluid is prevented from running down the outer surface of the spindle by the gland seal. When the cap is unscrewed, the spindle retained by the collar and O-ring moves downwards withdrawing the upper open end from the domed PTFE inner surface 56. This allows fluid within the body member 50 to flow through the holes 57 and down the hollow spindle. Thus in this valve, the means for occluding the flow passage is integral with the stem of the spindle, being simply the open end of the glass tube which is adapted to fit tightly against the inner PTFE surface 56. As the spindle moves downwards, so will the ridge 59 but it will remain in sealing contact with adjacent annular portions of the sealing member as it moves, thereby retaining the gland seal.

In all the above examples for wide bore drain lines, the insertion of a tubular sealing member off much less diameter than the diameter of the bore, not only gives flexibility (as described above), but it also reduces the area of the seal very significantly. Moreover, it avoids the need to provide a valve body having a precision bore of large diameter for the sealing surface of the gland seal.

However, the invention is not limited to use in wide bore applications, and FIGS. 6 and 7 provide examples of its use in stop cocks for laboratory glassware, and burette taps. The stop cock of FIG. 6 comprises a glass body member 61 with two arms 62, 63 of 6 mm internal diameter glass tubing, the body having an open end opposite one of the arms 63. Around the open end are screw threads 64 on which is mounted a closure member 65 moulded from a plastics material, the closure member also having external screw threads 66. Clamped between the closure member and the body member is the flange of a PTFE sealing member 67.

The spindle comprises a solid glass rod 68 having a cap 69 mounted at one end, the cap engaging screw threads 66 on the sealing member whereby rotation of the cap moves the glass rod at least axially. Around the other end of the rod is a PTFE O-ring 610 set into a groove and arranged to occlude the mouth of the lower arm 63 when the valve is closed. Around the spindle there is also an annular ridge 611 to form a gland seal essentially the same as that illustrated in FIG. 1.

This method of securing the closure member to the body member, i.e. by screwing one directly onto the other, can also be used for the larger scale valves described above by suitably modifying the shapes of the members, instead of clamping them together in the manner shown in FIGS. 1–3. However as the scale of the valves increases, it becomes increasingly difficult to form the screwed assembly, and clamped assemblies as described above are generally preferred for the larger sizes.

The burette tap shown in FIG. 7 is similar in style to the drain cock shown in FIG. 5. The lower end of the burette 71 is provided with external screw threads 72 onto which is screwed a closure member 73, the screwed end of the burette thus providing the body member of the valve. Within the body member is a sealing member having a tubular portion 74 with two annular ridges 75, 76 around its inner surface, and a flange 77 at one end, secured between the body member and the closure member. The closure member has a downwardly extending portion 78 having external screw threads onto which is screwed cap 79. The cap is mounted on a length of glass tubing 710 forming the valve spindle, the spindle being free to rotate and move axially with the cap as the latter is screwed onto or off the closure member. The end 711 of the glass tubing within the burette is closed but a hole 712 in the side is provided a short distance from the end. Otherwise the sides of the spindle are smooth and straight. The two ridges 75, 76 are biased into sealing contact with the spindle.

The lower ridge 76 provides a gland seal preventing loss of fluid down the outside of the spindle, whereas the upper ridge 75 provides the operating seal. In the position shown, the tap is closed, fluid being prevented from entering the hole by the operating seal. By raising the spindle, the hole 712 can be raised above the operating seal, in which position fluid within the burette can pass through the hole, down the inside of the hollow spindle, and out through the fine hole at the lower end 713. The tap is then open. Alternatively, a tap of this general design can be adapted to be opened by lowering the spindle until the closed end 711 goes below the upper ridge 75 and hence breaks the sealing contact between the ridge and the stem, thereby allowing fluid to flow into the portion between the two ridges and thence through the hole 712. The latter mode of operation is very similar to that of the valve shown in FIG. 5, which design may also be reduced in scale for application to a burette.

Figure 8:
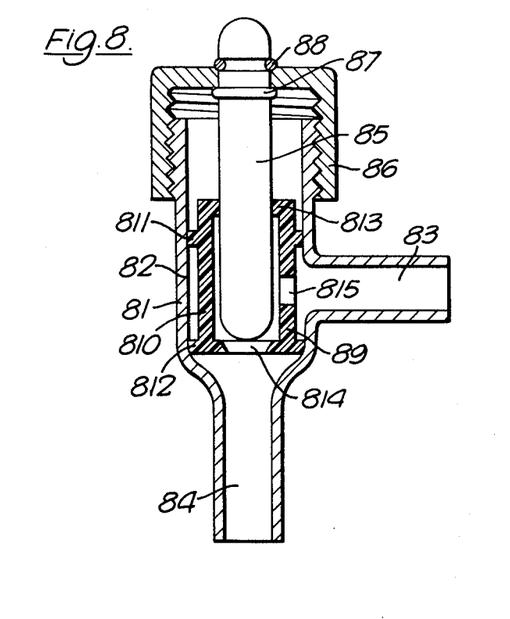
FIG. 8 is a section through a stop cock for laboratory glassware in which the sealing member has two flanges.

The valve shown in FIG. 8 comprises a hollow body 81 having a smooth cylindrical bore 82, and two side arms 83, 84 opening into the bore. The spindle is formed from a solid glass rod 85, rounded at the ends, with a cap 86 mounted at one end, using a ridge 87 around the rod and an O-ring 88 in a groove in the rod, to hold the cap in place. The cap engages threads around the body.

Within the bore is a PTFE sealing member 89 comprising a tubular portion 810 having two flanges 811, 812 extending radially outwards. At one end of the tubular portion is an annular ridge 813 extending inwards. The lower end of the tubular portion is closed except for a conical hole 814 of diameter smaller than the diameter of the rod. There is also a further hole 815 located between the two flanges.

In an experimental valve substantially as shown in FIG. 8, the diameter of the flanges was made 0.38 mm larger than the diameter of the bore. When the sealing member was slid into the bore it was a firm fit, and showed no inclination to slide out of place. Subsequent testing with liquids showed that a good seal was made both between the upper flange 811 and the bore to prevent loss of fluid through the open end of the body, and between the lower flange 812 and the lower end of the bore to prevent leakage from one side arm to the other. The annular ridge extended inwards to leave a hole 0.25 mm narrower than the diameter of the spindle rod, so that when the spindle was forced through the hole, the PTFE distended outwards, this being possible because of the ridge 813 being displaced from the plane of the flange 811.

Operation of the valve is effected by rotation of the cap, this advancing or withdrawing the end of the rod from the conical hole 814. When the rod is pressed against the conical sides of the hole 814, it occludes the flow passage. By being larger than the narrower end of the hole, the rod does not have to pass right through the hole to occlude it. Hence unlike the gland seal formed by the ridge 813, the tubular portion in the vicinity does not have to be distended outwards, and the lower flange 812 and the occludable hole 814 can be, and preferably are, coplanar.

Figure 9:
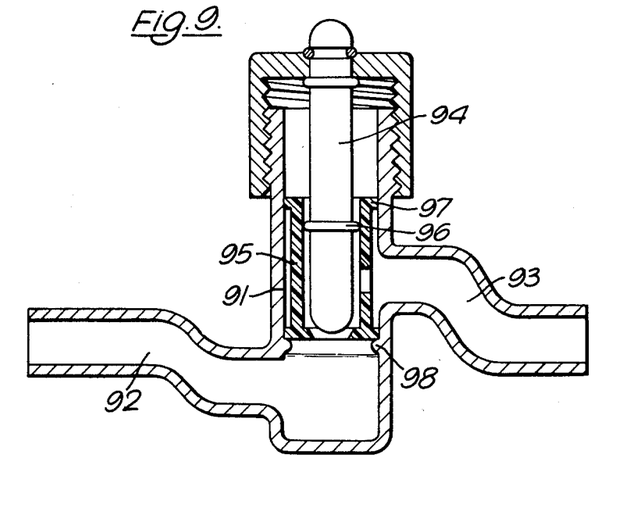
FIG. 9 is a section through a stop cock which is a modification of that shown in FIG. 8.

The valve shown in FIG. 9 is very similar in principle to that of FIG. 8. Thus the body has a bore 91 and two arms 92, 93 leading into the bore. The spindle is a solid rod 94 and both the gland seal and the operating seal are provided by a single PTFE sealing member 95 used in co-operation with the spindle. The sealing member differs from that of the previous illustration however, in having no internal ridge to seal against the spindle. Instead a ridge 96 is formed around the glass rod as an integral part of the spindle. This ridge 96 is oversize with respect to the internal diameter of the PTFE sealing member so as to distend the latter outwards, in essentially the same manner as that in which the PTFE ridge 813 did in the previous example. However, as the spindle moves up and down during operation of the valve, so various parts along the tubular portion become distended by the spindle ridge. To avoid the ridge and flange 97 becoming coplanar, the latter has been moved to the end of the tubular portion, in this valve.

A further difference from the previous valve is the provision of a supporting ridge 98 below the sealing member, so that when the spindle is screwed down to shut the valve, the sealing member is prevented from being displaced downwards. Such a ridge was unnecessary in the valve of FIG. 8 because the constriction where the lower arm 84 met the bore 82, served a similar function.

When assembling the valve of FIG. 9, the spindle should be located within the sealing member before the latter is inserted into the body. If the sealing member were first inserted into the body, the ridge on the spindle would have to pass the flange 97 while it is constrained by the body, and this could lead to breakage of the body if the latter were made of glass.

Figure 10:
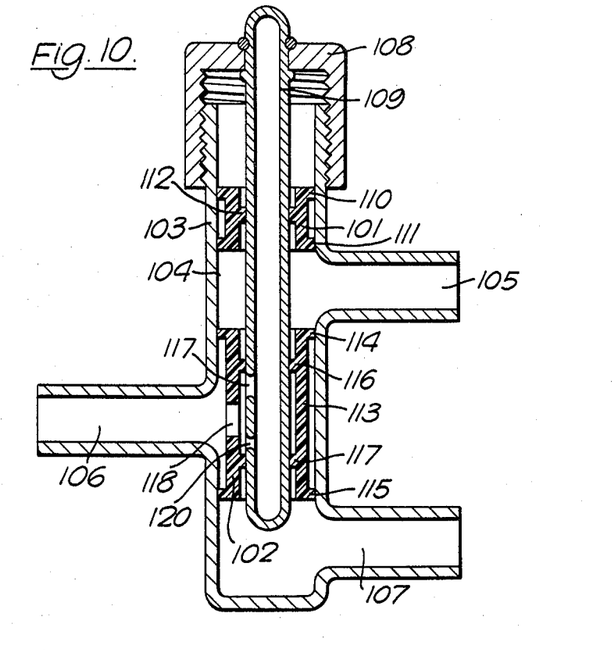
FIG. 10 is a section through a multiway stop cock.

The multiway valve of FIG. 10 employs two separate PTFE sealing members 101, 102, one to provide a gland seal and the other to provide the operating seal. The valve comprises a hollow body 103 having a tubular bore 104 into which open three side arms 105, 106 and 107. Screwed onto one end of the body is a cap 108 through which is located a tubular glass spindle 109. The upper (as oriented in FIG. 10) PTFE sealing member 101 comprises a short tubular portion with a flange 110, 111 at both ends, and mid-way between them is an annular ridge 112 biased against the spindle 109. This member provides the gland seal and operates in essentially the same manner as the gland seal described above with reference to FIG. 8.

The lower sealing member 102 comprises a tubular portion 113 supported by two terminal flanges 114, 115, and having two ridges 116, 117 biased against the spindle. A hole 118 penetrates the tubular portion between the two ridges. The spindle tube 109 is sealed except for two small holes 119, 120 spaced apart by a distance less than the distance between the two ridges but greater than the width of each ridge.

In the position shown in FIG. 10, the valve is closed. If the spindle is screwed in sufficiently from the two spindle holes 119, 120 to straddle the lower ridge 117, the lower two arms 106, 107 are brought into communication via the hollow spindle, the upper arm being sealed off by the upper ridge 116. Likewise, the upper arms 106 and 105 can be brought into communication to the exclusion of the lower arm 107, by raising the spindle. The orientation shown in FIG. 10 is not necessarily the optimum operating orientation. For example, when using liquids, a clockwise rotation through 90° would generally be preferred.

The spindle can be blocked off to reduce the dead volume if desired, and further holes in the spindle may be provided to increase the flow capacity, where these are all provided over the length less than that between adjacent sealing ridges. We have found that providing the holes were smoothly formed, we did not displace the seals during use at substantially atmospheric pressures, when using clearances such as those described for the valve of FIG. 8.

Figure 11:
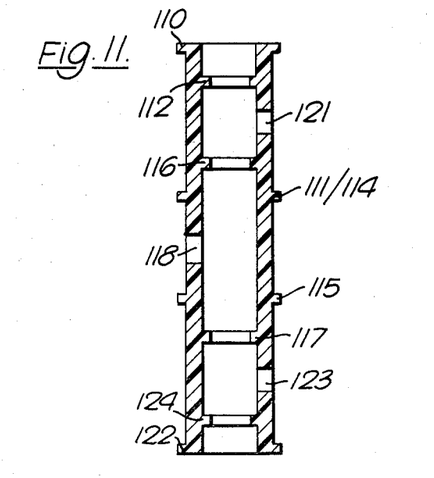
FIG. 11 is a section through an alternative sealing member for a multiway stop cock.

It is not necessary to use two separate sealing members. These may be combined, for example as shown in FIG. 11, and such a configuration is indeed preferred where pressure differentials are to be applied across the valve, as a single sealing member is more readily locked in position. To show the essentially similar format, the same reference numerals have been used where applicable, the main essential difference being the provision of a further hole 121 to allow fluid to enter the space between the upper two seals 112, 116, whereas in the FIG. 10 valve the fluid entered between the two separate sealing members 101, 102.

To be strictly comparable, the sealing member of FIG. 11 could be cut short immediately below the ridge 117. However, by extending it as shown with a further flange 122 and a further hole 123, with optionally a further ridge 124, the member may extend to the lower end of the valve and be thereby prevented from sliding further. A locking member may also be fitted above the sealing member to prevent the member sliding upwards, e.g. when vacuum is applied to the upper arm 105. The locking member may conveniently be a circlip located in a groove provided for it in the inner surface of the bore.

I claim:
1. A valve for controlling fluid flow, comprising
   a hollow body having a flow passage for the fluid;
   a sealing member formed of flexible polymeric material and consisting essentially of a generally radially resilient tubular portion encircled by at least one radially extending flange, the sealing member being supported within the hollow body by said radially extending flange;
   a movable spindle comprising means for occluding the flow passage during operation of the valve and a stem connected to or integral with the occluding means, the spindle passing through the tubular portion of the sealing member with the exterior surface of the spindle adjacent to the interior surface of the tubular portion; and
   means for defining at least one generally radially rigid annular ridge extending from one of said adjacent surfaces to contact the other and positioned so that at least during normal operation of the valve it remains displaced axially along said sealing member from the plane of each of said at least one radially extending flange, said ridge being oversized in that it stands proud from the surface from which it extends by an amount greater than the difference between the diameters of said two adjacent surfaces as measured before assembly of the valve, so that in the assembled valve the annular region of said tubular portion overlying said annular ridge, and said annular ridge, and the surface which said annular ridge contacts, are biased together by resilient radial distension of said tubular portion, thereby to provide a gland seal against loss of the fluid from the valve body.

2. A valve according to claim 1 wherein the sealing member is secured within the body by having its flange clamped between two relatively moveable portions of the body.

3. A valve according to claim 1 wherein there is a plurality of the flanges and wherein the flanges are spaced along the tubular portion of the sealing member.

4. A valve according to claim 3 in which the body comprises a tubular bore into which the sealing member is slid, the diameter of the bore being undersized with respect to the flanges so as to hold the sealing member firmly in position.

5. A valve according to claim 4 in which the body has stops located so as to limit sliding movement of the sealing member along the bore.

6. A valve as recited in claim 1 wherein said flexible polymeric material forming said sealing member is a polytetrafluoroethylene.

* * * * *